United States Patent
Butler (10) Patent No.: US 8,082,825 B2
(45) Date of Patent: Dec. 27, 2011

(54) HEALTH AND SAFETY SYSTEM FOR A TABLE SAW

(76) Inventor: David J. Butler, Cotuit, MA (US)

(*) Notice: Subject to any disclaimer, the term of this patent is extended or adjusted under 35 U.S.C. 154(b) by 63 days.

(21) Appl. No.: 12/481,437

(22) Filed: Jun. 9, 2009

(65) Prior Publication Data

US 2010/0307307 A1    Dec. 9, 2010

(51) Int. Cl.
  *B26D 5/00* (2006.01)
  *B26D 1/14* (2006.01)
  *B27B 5/18* (2006.01)
(52) U.S. Cl. ......... 83/58; 83/62.1; 83/DIG. 1; 83/471.3; 83/477.1; 83/490; 83/589; 83/581
(58) Field of Classification Search ............. 83/58, 62.1, 83/DIG. 1, 471.3, 477.1, 490, 589, 581, 486, 83/485, 491, 522.12, 781, 74, 788, 477.2, 83/13, 471, 397.1, 478, 168; 340/590, 686.5; 241/37.5
See application file for complete search history.

(56) References Cited

U.S. PATENT DOCUMENTS

| | | | |
|---|---|---|---|
| 264,412 A | 9/1882 | Kuhlmann | |
| 278,130 A | 5/1883 | Groff | |
| 299,480 A | 5/1884 | Kuhlmann et al. | |
| 302,041 A | 7/1884 | Sill | |
| 509,253 A | 11/1893 | Shields | |
| 545,504 A | 9/1895 | Hoover | |
| 648,000 A | 4/1900 | Thomas | |
| 713,196 A | 11/1902 | Bennett | |
| 997,720 A | 7/1911 | Troupenat | |
| 1,035,735 A | 8/1912 | Pogue | |
| 1,037,843 A | 9/1912 | Ackley | |
| 1,050,649 A | 1/1913 | Wilderson | |
| 1,054,558 A | 2/1913 | Jones | |
| 1,074,198 A | 9/1913 | Phillips | |
| 1,082,870 A | 12/1913 | Humason | |
| 1,089,901 A | 3/1914 | Carson | |
| 1,101,515 A | 6/1914 | Adam | |
| 1,125,364 A | 1/1915 | Martin | |
| 1,126,970 A | 2/1915 | Folmer | |
| 1,148,169 A | 7/1915 | Howe | |
| 1,154,209 A | 9/1915 | Rushton | |

(Continued)

FOREIGN PATENT DOCUMENTS

DE    19609771    *    6/1998

OTHER PUBLICATIONS

Hauer Sebastian, Active Safety Device for Table-Mounted Circular Saw, Translation of the DE 19609771, publication date Jun. 1998.*

(Continued)

*Primary Examiner* — Ghassem Alie
(74) *Attorney, Agent, or Firm* — Milton Oliver, Esq.; Oliver Intellectual Property LLC (57) ABSTRACT

An improved health and safety system for a table saw includes one or more of: a blade guard that protects the operator from the saw blade, and contains and collects sawdust; a proximity detector and emergency saw motor braking means for use in connection with such blade guard; an anti-kickback device for use in connection with such blade guard, a rip fence adapter for use in connection with such a blade guard, and hoses and fittings to connect the dust containment and collection system of said blade guard to a shop dust collection blower or vacuum system. The system protects the saw operator from potential traumatic injury to a hand, and from ingesting potentially carcinogenic sawdust.

9 Claims, 10 Drawing Sheets

U.S. PATENT DOCUMENTS

| | | | |
|---|---|---|---|
| 1,244,187 A | 10/1917 | Frisbie | |
| 1,258,961 A | 3/1918 | Tattersall | |
| 1,311,508 A | 7/1919 | Harrold | |
| 1,381,612 A | 6/1921 | Anderson | |
| 1,397,606 A | 11/1921 | Smith | |
| 1,427,005 A | 8/1922 | McMichael | |
| 1,464,924 A | 8/1923 | Drummond | |
| 1,465,224 A | 8/1923 | Lantz | |
| 1,496,212 A | 6/1924 | French | |
| 1,526,128 A | 2/1925 | Flohr | |
| 1,551,900 A | 9/1925 | Morrow | |
| 1,552,553 A | 9/1925 | Georgia | |
| 1,553,996 A | 9/1925 | Federer | |
| 1,616,478 A | 2/1927 | Watson | |
| 1,640,517 A | 8/1927 | Procknow | |
| 1,662,372 A | 3/1928 | Ward | |
| 1,712,828 A | 5/1929 | Klehm | |
| 1,830,151 A | 11/1931 | Wilderson | |
| 1,879,280 A | 9/1932 | James | |
| 1,904,005 A | 4/1933 | Masset | |
| 2,007,887 A | 7/1935 | Tautz | 143/159 |
| 2,095,330 A | 10/1937 | Hedgpeth | |
| 2,106,321 A | 1/1938 | Guertin | |
| 2,257,459 A | 2/1939 | Gardner | |
| 2,313,686 A | 3/1943 | Uremovich | |
| 2,328,244 A | 4/1943 | Woodward | |
| 2,496,613 A | 5/1944 | Wodward | |
| 2,384,688 A | 5/1945 | Litman | |
| 2,394,556 A | 2/1946 | Martin | |
| 2,425,331 A | 8/1947 | Kramer | |
| 2,466,325 A | 4/1949 | Ocenasek | |
| 2,517,649 A | 4/1949 | Frechtmann | |
| 2,487,396 A | 11/1949 | Summers | |
| 2,562,396 A | 7/1951 | Schutz | |
| 2,572,326 A | 10/1951 | Evans | |
| 2,593,596 A | 4/1952 | Olson | |
| 2,623,555 A | 12/1952 | Eschenburg | |
| 2,731,049 A | 1/1956 | Akin | |
| 2,786,496 A | 3/1957 | Eschenburg | |
| 2,823,711 A | 2/1958 | Kaley et al. | |
| 2,926,709 A | 3/1960 | Kaley | |
| 3,043,353 A | 7/1962 | Sherwen et al. | |
| 3,105,530 A * | 10/1963 | Peterson | 83/478 |
| 3,232,326 A | 2/1966 | Speer et al. | |
| 3,249,134 A * | 5/1966 | Vogl et al. | 83/478 |
| 3,356,111 A | 12/1967 | Mitchell | |
| 3,525,183 A | 8/1970 | Gargrave | |
| 3,656,519 A | 4/1972 | Stackhouse | |
| 3,785,230 A * | 1/1974 | Lokey | 30/388 |
| 3,805,639 A | 4/1974 | Peter | |
| 3,858,095 A * | 12/1974 | Friemann et al. | 192/129 A |
| 3,884,101 A | 5/1975 | Silkin | |
| 3,949,636 A | 4/1976 | Ball et al. | |
| 4,016,490 A | 4/1977 | Weckenmann | |
| 4,026,174 A | 5/1977 | Fierro | |
| 4,033,218 A * | 7/1977 | Donatelle | 83/478 |
| 4,109,144 A | 8/1978 | Vidmar | |
| 4,145,940 A | 3/1979 | Woloveke | |
| 4,212,214 A | 7/1980 | Bippus | |
| 4,230,005 A | 10/1980 | Varga | |
| 4,403,534 A | 9/1983 | Thiele | |
| D275,015 S | 8/1984 | von der Wouw | D15/133 |
| 4,467,686 A | 8/1984 | Pyle | |
| 4,615,247 A | 10/1986 | Berkeley | |
| D292,407 S | 10/1987 | Legler et al. | D15/133 |
| 4,721,023 A | 1/1988 | Bartlett et al. | |
| 4,831,279 A | 5/1989 | Ingraham | |
| 4,875,398 A | 10/1989 | Taylor et al. | |
| 5,081,406 A * | 1/1992 | Hughes et al. | 318/478 |
| 5,084,972 A | 2/1992 | Waugh | |
| 5,159,864 A | 11/1992 | Wedemeyer | |
| 5,181,447 A | 1/1993 | Hewitt | 83/447 |
| 5,231,906 A | 8/1993 | Kogej | 83/478 |
| 5,291,152 A | 3/1994 | Seale | 331/65 |
| 5,317,944 A | 6/1994 | Hewitt | 83/447 |
| 5,857,507 A | 1/1999 | Puzio et al. | 144/287 |
| 5,893,311 A | 4/1999 | Huang | 83/397 |
| 5,931,072 A | 8/1999 | Shibata | 83/98 |
| 5,941,766 A | 8/1999 | Viersen | 15/301 |
| 5,970,835 A | 10/1999 | Kenyon et al. | 83/477.2 |
| 5,979,523 A | 11/1999 | Puzio et al. | 144/286.5 |
| 6,009,782 A | 1/2000 | Tajima et al. | 83/99 |
| 6,131,629 A | 10/2000 | Puzio et al. | 144/252.1 |
| 6,170,370 B1 | 1/2001 | Sommerville | 83/102.1 |
| 6,405,624 B2 | 6/2002 | Sutton | 83/102.1 |
| 6,418,829 B1 | 7/2002 | Pilchowski | 83/397 |
| 6,470,778 B1 | 10/2002 | Kaye et al. | 83/100 |
| 6,578,460 B2 | 6/2003 | Sartori | 83/100 |
| 6,715,388 B1 | 4/2004 | Jaksha | 83/102 |
| 6,796,208 B1 | 9/2004 | Jorgensen | 83/100 |
| 6,813,983 B2 * | 11/2004 | Gass et al. | 83/62.1 |
| 6,853,300 B2 * | 2/2005 | Kuan | 340/565 |
| 6,857,345 B2 | 2/2005 | Gass | 83/62.1 |
| 6,900,728 B2 | 5/2005 | Metzger, Jr. | 340/562 |
| 6,920,814 B2 | 7/2005 | Gass et al. | 83/62.1 |
| 6,922,153 B2 | 7/2005 | Pierga et al. | 340/686.5 |
| 6,959,631 B2 | 11/2005 | Sako | 83/58 |
| 6,994,004 B2 | 2/2006 | Gass et al. | 83/62.1 |
| 7,000,515 B2 | 2/2006 | Jorgensen | 83/100 |
| 7,024,975 B2 | 4/2006 | Gass | 83/62.1 |
| 7,055,417 B1 | 6/2006 | Gass | 83/58 |
| 7,134,373 B1 | 11/2006 | Vice | 83/477.2 |
| 7,137,327 B2 | 11/2006 | Garcia et al. | 83/102.1 |
| 7,171,879 B2 | 2/2007 | Gass et al. | 83/58 |
| 7,173,537 B2 | 2/2007 | Voigtlaender | 340/585 |
| 7,197,969 B2 | 4/2007 | Gass et al. | 83/63 |
| 7,210,383 B2 | 5/2007 | Gass et al | 83/58 |
| 7,231,856 B2 | 6/2007 | Gass | 83/58 |
| 7,290,474 B2 | 11/2007 | Keller | 83/477.2 |
| 7,373,863 B2 | 5/2008 | O'Banion et al. | 83/63 |
| 2003/0058121 A1* | 3/2003 | Gass et al. | 340/686.5 |
| 2004/0017294 A1 | 1/2004 | Metzger, Jr. | 340/562 |
| 2004/0194594 A1* | 10/2004 | Dils et al. | 83/13 |
| 2006/0096425 A1 | 5/2006 | Keller | 83/13 |
| 2008/0016998 A1 | 1/2008 | Keller | 83/13 |
| 2009/0241748 A1 | 10/2009 | Keller | 83/522.13 |

OTHER PUBLICATIONS

Mehler, Kelly: Tablesaw Kickback, Jan.-Feb. 1996, pp. 64-67.
Mehler, Kelly: A Safer Tablesaw Finally Arrives, 2005, pp. 66-67.

* cited by examiner

HEALTH AND SAFETY SYSTEM FOR A TABLE SAW

CROSS-REFERENCE TO RELATED APPLICATION(S)

This application relates to subject-matter more fully explained in my application Ser. No. 12/481,542, entitled BLADE ENCLOSURE FOR A TABLE SAW, filed the same day as the present application, the disclosure of which is hereby incorporated by reference.

FIELD OF THE INVENTION

The present invention relates generally to systems for power saws, providing improved health and safety during operation.

BACKGROUND

Table saws are power tools used to cut work pieces of wood, plastic and other materials. Such saws are among the most widely used power tools in woodworking and materials processing shops, carpentry and building work sites. Four general classes of table saws are in common use including bench top table saws, contractor table saws, cabinet table saws and hybrid table saws.

A table saw includes a flat surface, or table, with a circular saw blade extending vertically up through a slot in the table. The saw blade is mounted on an arbor which is driven by an electric motor (directly, by belt, or by gears). The saw operator slides a workpiece on the table against and past the blade while the circular blade revolves at a high rate of speed (typically about 4,000 rpm) and cuts through the workpiece. The thickness of the workpiece that can be sawed completely through, or the depth of the cut into the workpiece, is controlled by moving a saw motor trunnion or carriage, holding the motor, saw arbor and saw blade, up or down, relative to the saw table top. The higher the blade protrudes above the table, the deeper the cut that is made in the workpiece. Most often the cut into the workpiece is made perpendicular to the saw table but most table saws also can be adjusted to make cuts at angle of up to 45 degrees from the perpendicular. Such angle or bevel cuts are made by rotating the saw motor carriage from the perpendicular such that the angle of the motor, blade arbor and blade are adjusted to provide the desired cutting angle.

Table saws are generally designed to allow rotation of the carriage, motor, arbor and blade either to the left or to the right (but not both).

Table saws typically are provided with various pieces of auxiliary equipment including a rip fence to guide a workpiece, make rip cuts, that is to cut work pieces generally with the grain of the wood, and a miter gauge to cut work pieces perpendicular to, or generally at an angle to, the grain. When a saw cuts into a piece of wood or other workpiece, the removal of material leaves a void called the "kerf." A splitter, a vertical projection located (relative to the saw operator) behind the saw blade, is provided as a required safety attachment for all table saws currently sold in the United States. The splitter is typically either a pin or a fin-shaped metal plate, and is intended to fit within the generally narrow material-void or saw-kerf formed directly behind the saw blade during cutting operations. The splitter is typically slightly narrower in width than the saw-kerf and is aligned directly in line with the saw-kerf and is intended to prevent the cut in the wood from closing, thereby pinching the back of the blade and kicking back the workpiece toward the operator. In addition to the splitter, table saws are also typically provided with an anti-kickback device that most often consists of serrated or toothed anti-kickback pawls as well as a clear plastic blade cover. The use of a typical saw blade guard pivotally supported by a splitter is shown in U.S. Pat. No. 6,578,460 issued to SARTORI. Table saws also have an easily removable insert closely surrounding the blade in the table top. The insert is removable, in order to access the saw blade for blade changing. For example, one may wish to swap out a blade which has become dull, and replace it with a sharper blade.

Of the many power tools used in a typical woodworking shop, table saws present perhaps the greatest risk of injury. Table saws present a very serious risk of injury or impairment of health to operators in several ways. A high risk of trauma injury to the operator exists because the operator is often exposed to the saw blade, which is spinning at about 4,000 rpm when in use. The blade is designed to cut through hard materials such as wood, cuts very quickly through human flesh and can sever a finger, several fingers or an entire hand upon the operator's slightest slip or inadvertent misplacement. Second, table saws are prone to sudden "kickback" of the work piece. This occurs when the blade lifts the workpiece off the table and hurls the workpiece backward (opposite to the direction of workpiece feed), at a high velocity, in the direction of the operator. It is not uncommon for a kicked-back workpiece to have sufficient velocity to become embedded in a wall or to cause trauma injury to the operator. Serious injury can also occur from kickback if the operator is struck in the face or the eye.

Safety features or systems have been developed to minimize the risk of injury to saw operators. Probably the most common saw safety feature is a blade guard that physically blocks a user from making contact with the spinning blade. Prior art blade guards have been designed to be pivotally attached to a splitter as shown in U.S. Pat. No. 2,786,496 issued to ESCHENBURG and U.S. Pat. No. 4,625,604 issued to HANDLER. Prior art blade guards have also been designed to be pivotally attached to an overhead arm which is supported by a vertical column that may either be attached to the saw or that may be free-standing as shown in U.S. Pat. No. 3,105,530 issued to PETERSON and U.S. Pat. No. 7,000,515 issued to JORGENSEN. Neither of these prior patents provide the important fixed hold-down safety capability of the present invention and they suffer from other shortcomings as well. While prior art blade guards may effectively reduce the risk of injury, it is well known in the woodworking field that the most common types of prior art blade guards, more often than not, are removed from the table saw altogether. The widespread perception is that such devices are cumbersome and interfere with the operation of the saw in many situations. Also, there are instances where the nature of the sawing operation to be performed precludes using a prior art guard, such as when making non-through cuts such as grooves or dado cuts. The guard must be easily removed to facilitate such special cuts and often the operator fails to reinstall the blade guard after the special cut is completed. As a result, many injuries occur each year when saws are operated without a blade guard being properly in place.

At least one recent saw safety system, as shown in U.S. Pat. No. 6,994,004 issued to GASS, has been developed that does not entirely rely on such guards, but instead detects contact of the operator's body with the saw blade. An electrical signal is applied to the saw blade and any contact of the operator with the blade causes a sudden change in the electrical characteristic of the applied signal and is immediately detected by a monitoring circuit. The monitoring circuit rapidly triggers release of a spring which forces a metal block into the teeth of the spinning blade, quickly stopping it and destroying the saw blade and metal block assembly. While this system offers an important improvement in table saw safety, it is not without drawbacks. The device is only available with the purchase of saw models having the safety feature built-in; it cannot be retrofitted onto existing table saws. The system is said to be subject to false triggering and each such event destroys both the saw blade and the fused spring release module both of which are costly to replace and require the saw to remain without the safety feature until the parts are replaced. U.S. Pat. No. 7,290,474 issued to KELLER also offers a destructive method of stopping a table saw blade.

SUMMARY OF THE INVENTION

There exists a need for an improved blade guard for table saws that significantly reduces the risk of serious injury to a user who accidentally contacts the spinning blade, while overcoming the limitations of the prior art. A first health & safety aspect of the present invention provides such a blade guard that can be included with new table saws or can be retrofitted to existing table saws, to provide improved safety, while facilitating convenient and efficient saw operation.

In addition to the risks from trauma injury, another major table saw health consideration involves the large amount of dust created by table saw cutting operations. Sawdust has recently been determined to be a human carcinogen. Long-term exposure to sawdust may actually prove to be an even greater danger to saw operators than the risk of serious trauma injury. Therefore, a second health and safety improvement aspect of the present invention concerns the process of containment and extraction of the sawdust generated by the table saw. Prior art sawdust collection hoods and systems have been developed to minimize saw operator exposure to sawdust. Probably the most common dust collection systems have been hoods that collect dust above the saw table and move the dust away from the saw and the operator by means of a vacuum producing system or blower.

Prior art sawdust collection hoods have been designed to be suspended above the saw table as shown in U.S. Pat. No. 4,576,072 issued to TERPSTRA, and U.S. Pat. No. 4,875,398 issued to TAYLOR, et al. Such prior art dust collection systems have thus been bulky, awkward and interfere with the operator's use of the table saw and of the shop work space. Thus, there exists a need for a table saw with an improved dust containment and collection system that significantly reduces the long term risks of chronic exposure to carcinogenic sawdust while facilitating the saw operator's access to and operation of the table saw and the shop work space more generally. The present invention provides such a system for table saws, and may be retrofitted onto many existing table saw designs.

DETAILED DESCRIPTION OF THE INVENTION

Figure 1:
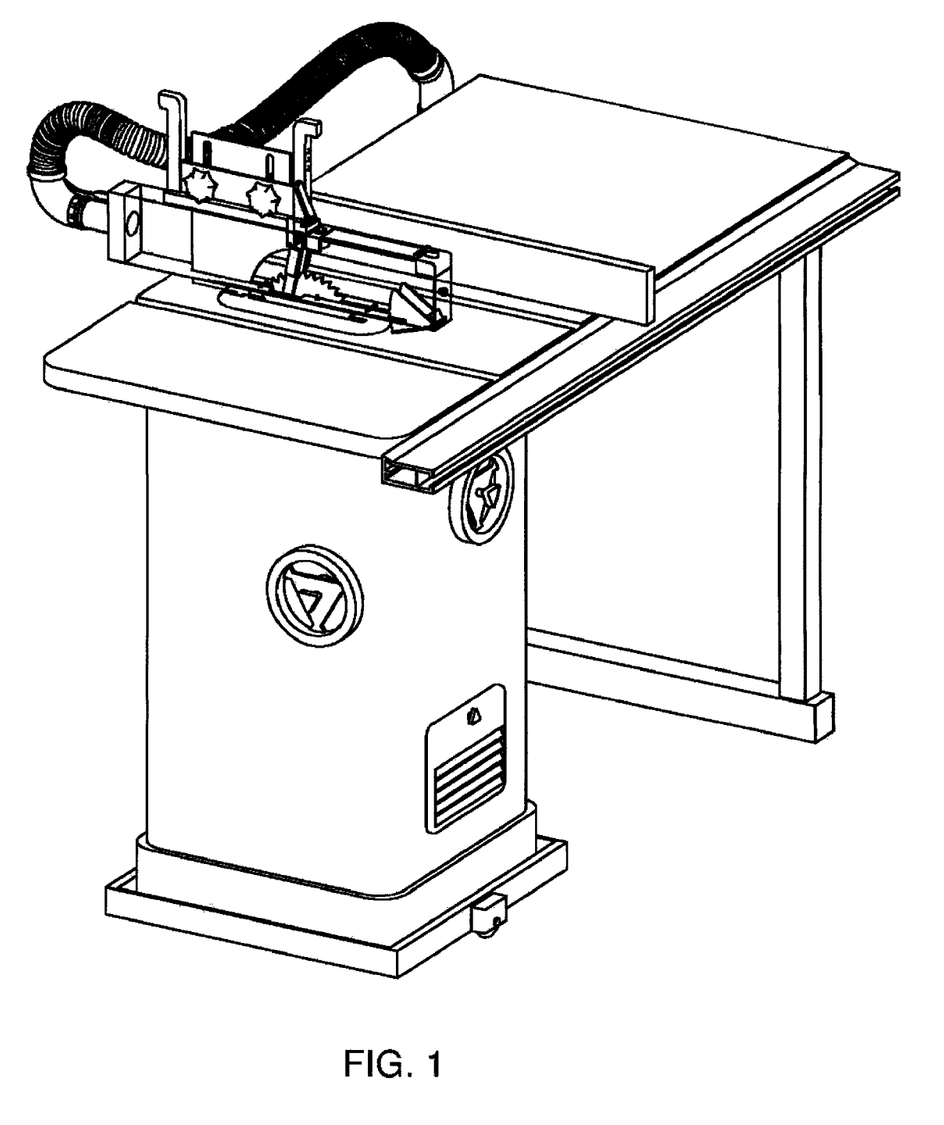
FIG. 1 is a perspective view of a table saw in accordance with one embodiment of the present invention.

An exemplary embodiment of a table saw in accordance with the present invention is illustrated schematically in FIG. 1. The table saw of FIG. 1 may be any type, model or configuration of table saw suitable for cutting wood, plastic, or other suitable materials and that incorporates one or more of the various aspects of the present invention. The present invention includes complete saws as well as systems, parts, pieces or kits of parts which may be mounted on existing table saws to adapt or retrofit them in accordance with one or more of the various aspects of the present invention.

Figure 2:
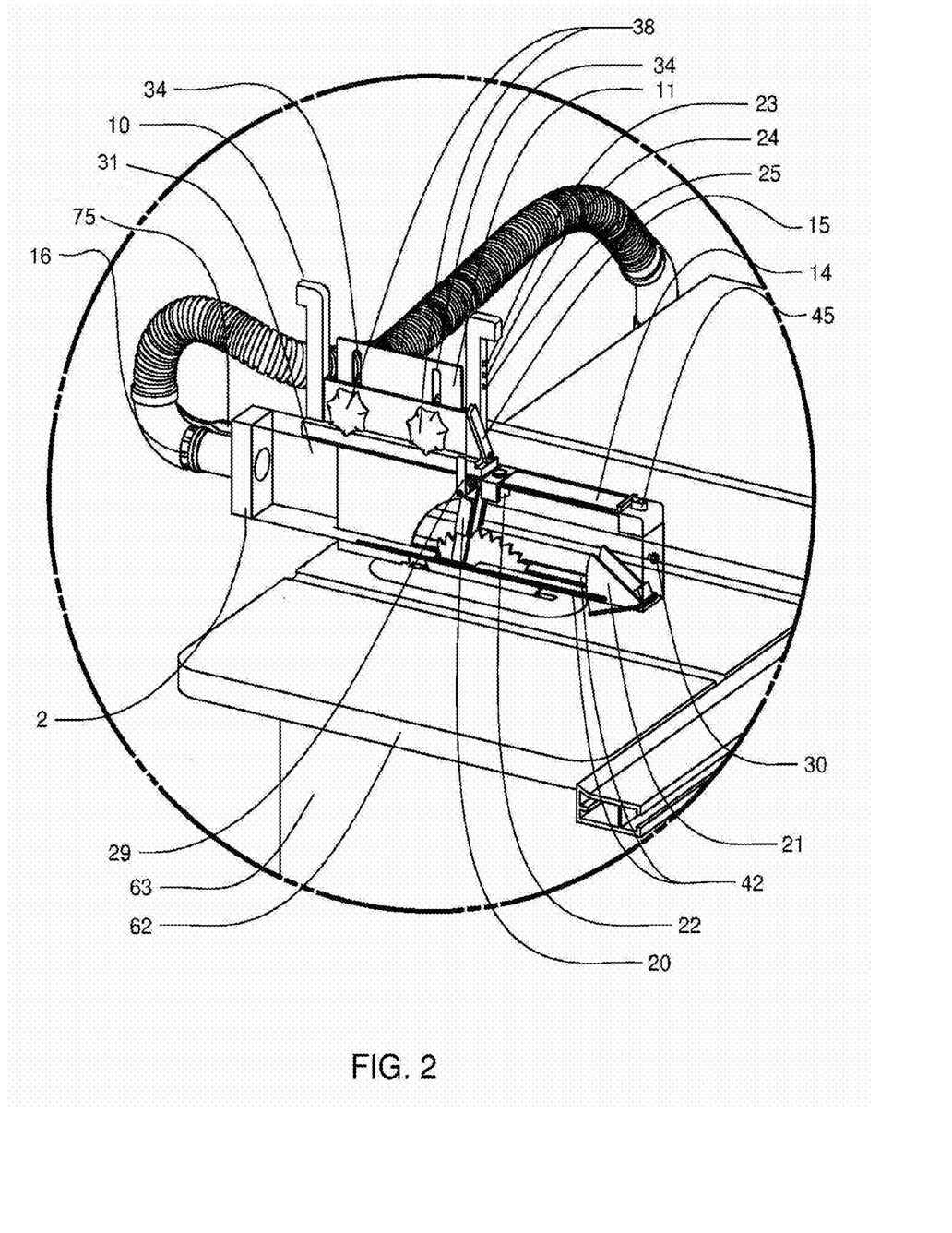
FIG. 2 is a perspective view of a blade guard for a table saw in accordance with one embodiment of the present invention.

One aspect of the present invention is an enclosed blade guard assembly 2, FIG. 2 for such a table saw. Blade guard assembly 2 is mounted above the upper table surface 62 and is supported either solely by the splitter plate 11, as shown in FIGS. 1-4, or alternately may be supported by a separate mounting plate 73, (FIG. 9) and an independent support bracket 71, which is bolted to the peripheral rear edge of the saw table top with bolt 72. Bolt 72 may be fitted to an existing threaded hole in the rear edge of the saw table top 62 or a hole may be drilled and tapped to accept bolt 72. Bolt 74 attaches the mounting plate 73 to the support bracket 71. It will be appreciated that one of ordinary skill in the design, manufacture or operation of table saws would, if given the disclosures herein, understand that there are many ways in which enclosed blade guard assembly 2 could be mounted to the table saw.

The enclosed blade guard assembly or enclosure 2 is fixed in position and firmly held, directly above the saw blade when the saw is in operation. Enclosed blade guard assembly 2 incorporates one or more of several aspects of the present invention disclosed in detail herein, including: an enclosure support frame 10, a combined splitter plate and support mechanism 11, or the alternate mounting plate 73 (FIG. 9) and a height-adjustment mechanism made up of parts 34, 36, 37, 38, as shown in FIG. 4.

The enclosed blade guard assembly 2 also functions to contain and extract sawdust, as it is being generated above the work piece during cutting operations, and said sawdust is extracted by means of a vacuum device through the rear of the blade guard assembly enclosed blade guard assembly, via dust collection exit port 16 (FIG. 2).

Figure 3:
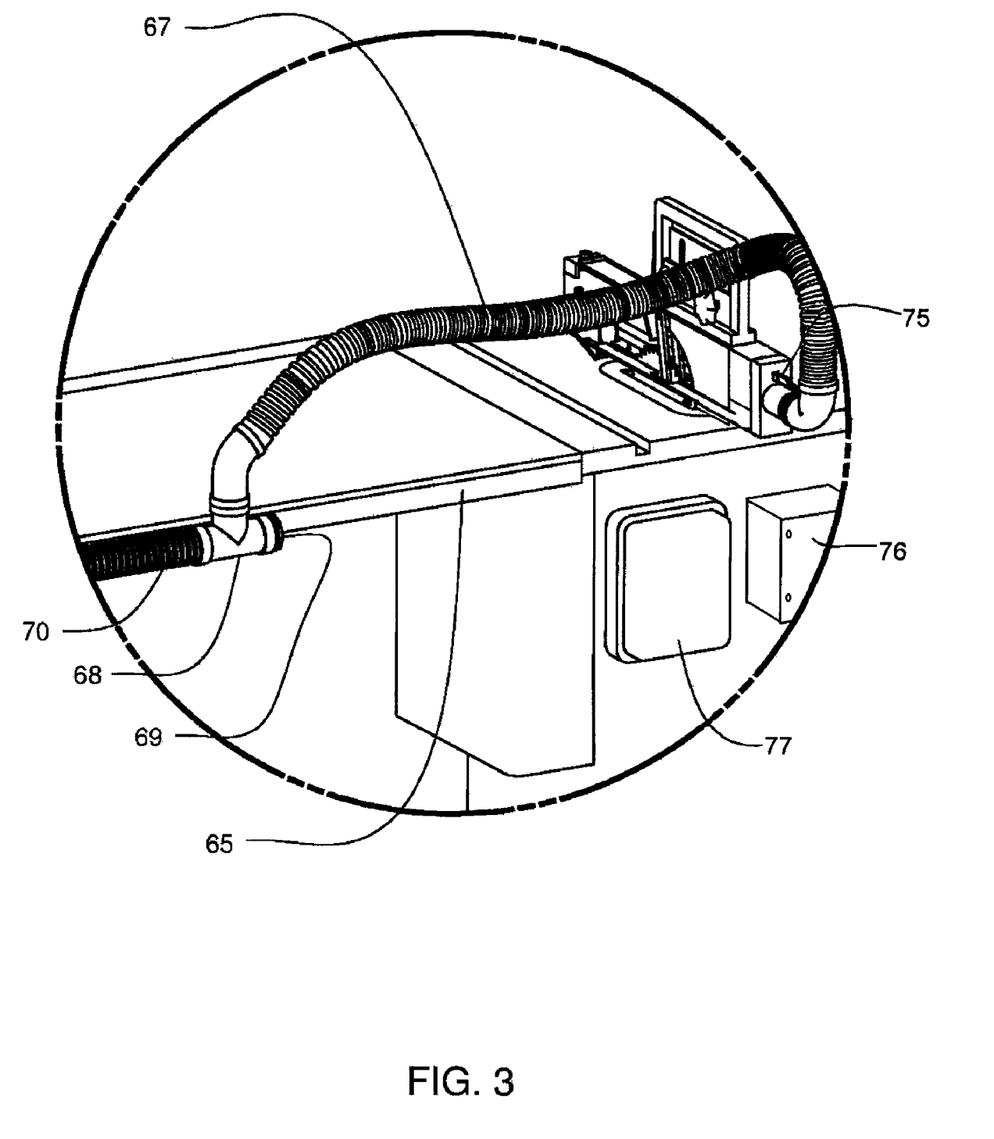
FIG. 3 is a perspective view of a connection system for connecting a dust containment and collection vacuum unit to a blade guard for a table saw in accordance with one embodiment of the present invention.
Figure 4:
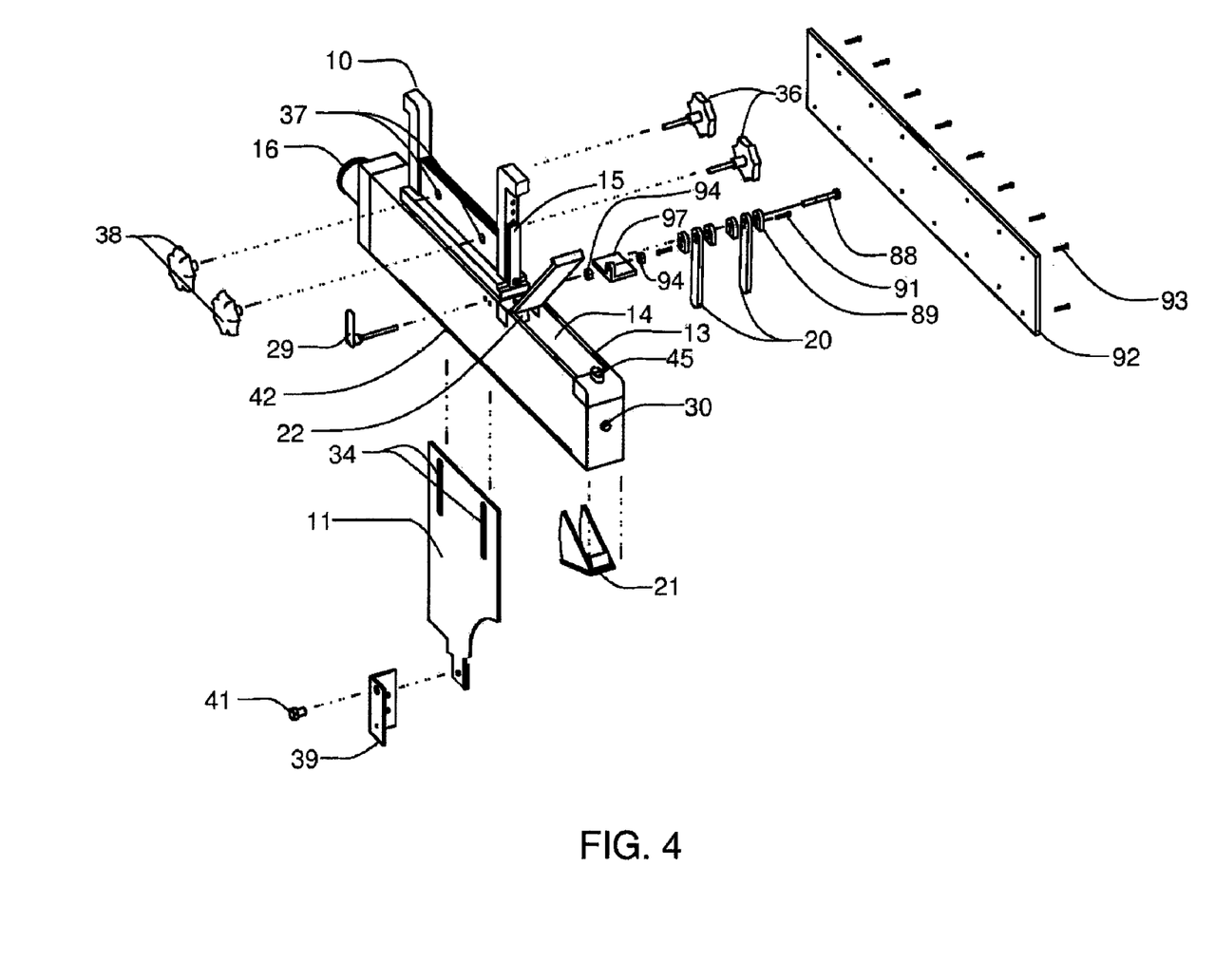
FIG. 4 is a detailed, partially exploded view, of a preferred embodiment of a blade guard for a table saw in accordance with the present invention.
Figure 6:
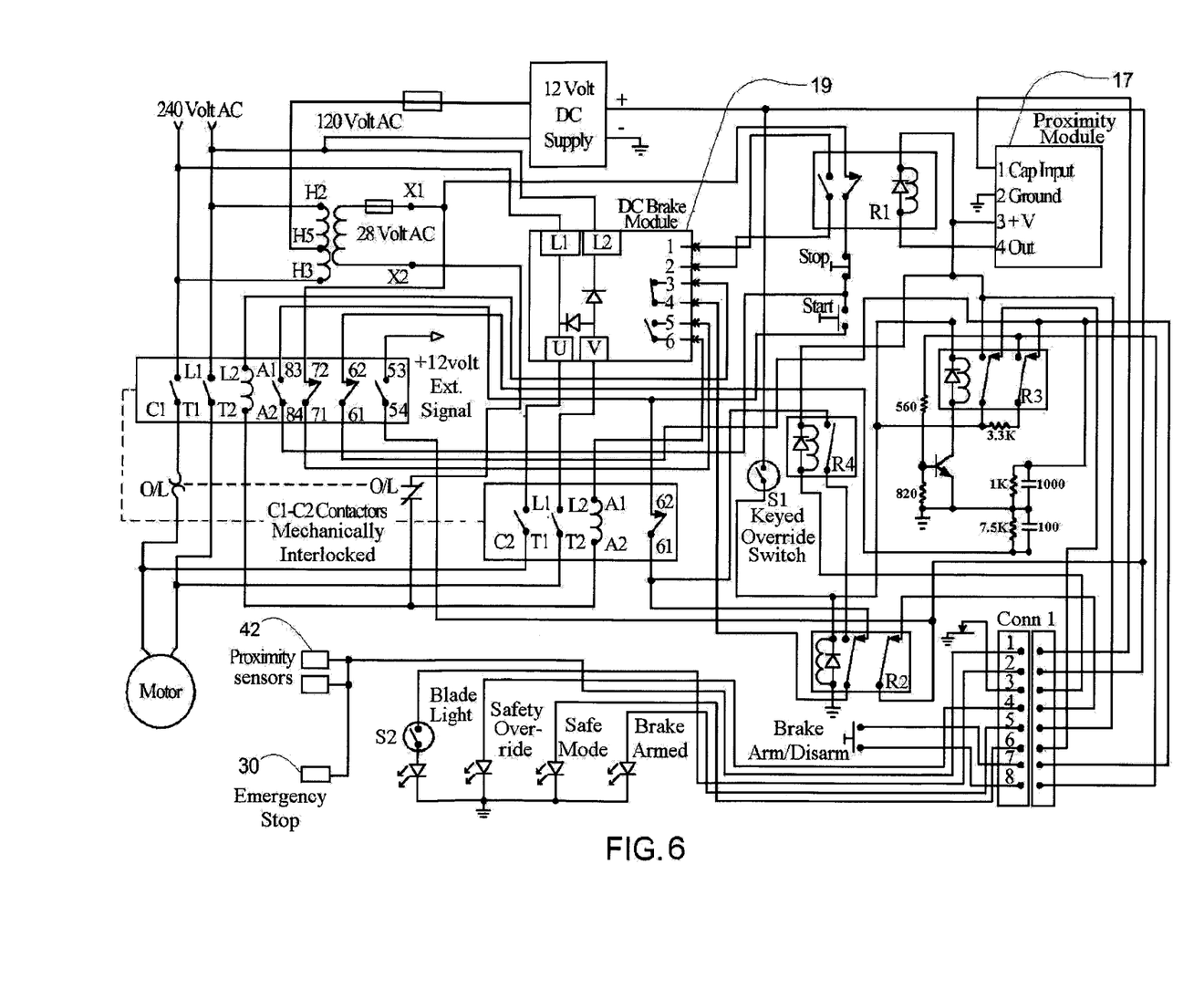
FIG. 6 is a schematic circuit diagram of a preferred embodiment of a proximity detection, monitoring and braking system for a table saw in accordance with the present invention.

The exemplary enclosed blade guard assembly 2, preferably comprises a removable saw blade viewing port 14, electronic operator proximity detectors 42 located along the bottom edge of the enclosed blade guard assembly, anti-kickback pawls 20, a disengaging lever 29 for the anti-kickback pawls 20, a latch mechanism 15 to secure the disengaging lever 29 for the anti-kickback pawls 20 in an open position, a dropdown sawdust blowback containment box 21, a light 22, interior to enclosed blade guard assembly 2, to illuminate the saw blade, electronic condition indicators 23, 24 and 25 to permit the operator to visually determine when the saw is in a ready and safe condition to begin sawing, a brake arming switch 45, and an emergency stop switch 30, all shown in FIG. 2 or FIG. 4. An exemplary electronic saw motor control unit 76 is shown schematically in FIG. 6, which receives input signals from proximity detectors 42 and which engages a motor brake circuit 19 in response to such a signal, is also shown in FIG. 6. A cable connector 75 (FIG. 2) is located at the rear of the enclosed blade guard assembly and is shown schematically as CONN1 in FIG. 6. The circuitry shown in FIG. 6, wired to the left of connector CONN1, is contained within the enclosed blade guard assembly and the remaining motor control circuitry is physically contained in braking control enclosure 76 (FIG. 3) and in manufacturer-supplied magnetic motor control enclosure 77 (FIG. 3). It will be appreciated that one of ordinary skill in the design, manufacture or operation of table saws and motor controls would, if given the disclosures herein, understand that there are many ways in which to implement the electronic controls shown in FIG. 6, and that such circuitry should be designed and configured so as to minimize the time required for detection of operator proximity, and to minimize the motor braking time, consistent with sound electronic practices.

Figure 9:
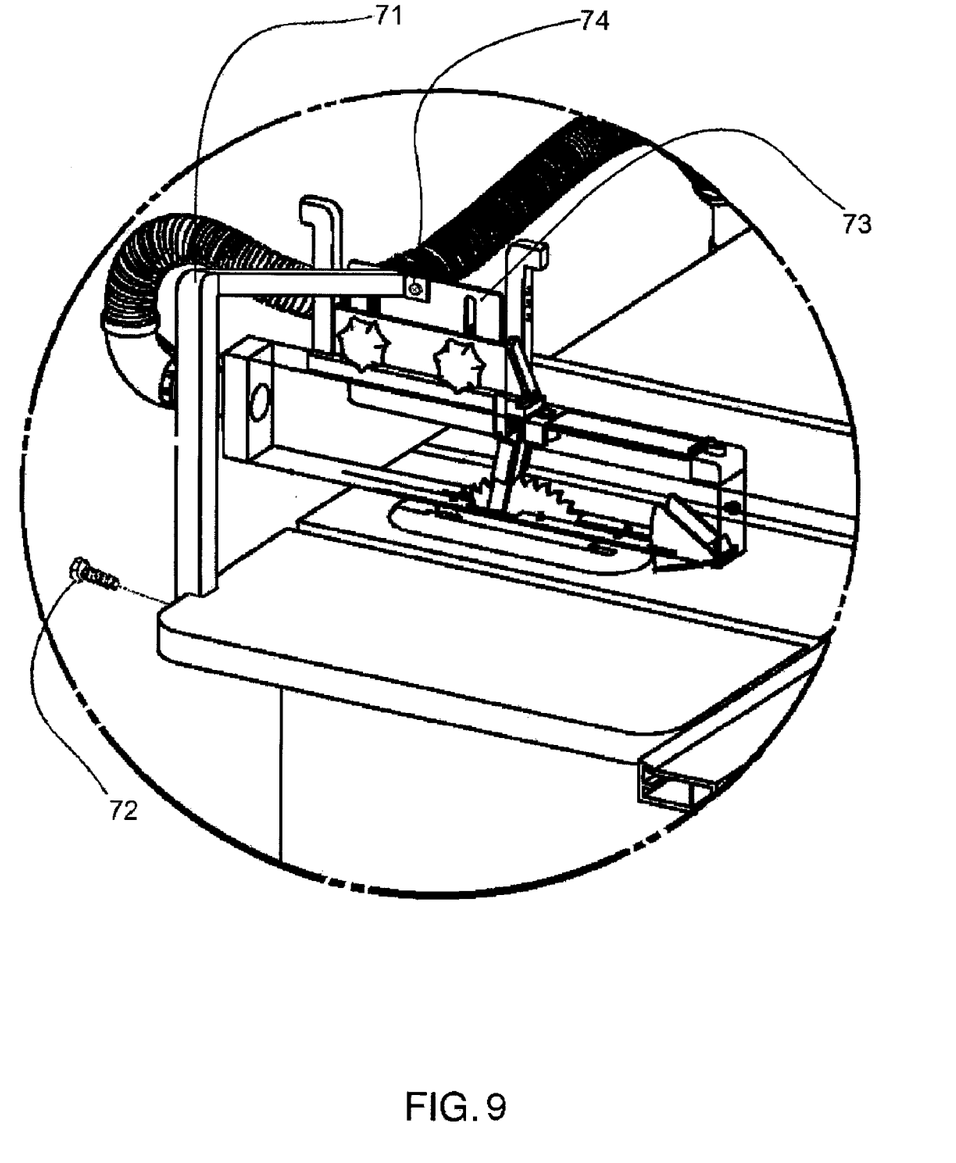
FIG. 9 is a perspective view of an alternate mounting method of a blade guard for a table saw in accordance with one embodiment of the present invention.

Enclosed blade guard assembly 2 may be made of any suitable material. Preferably, at least a sufficient portion of the enclosed blade guard assembly should be fabricated of a durable yet transparent material such as glass, a thermoplastic such as acrylic, polycarbonate, PET (polyethylene terephthalate), or PETG (polyethylene terephthalate glycol), or other suitable material, so that the operator may readily observe the workpiece while it is being cut. Enclosed blade guard assembly 2 may be made by any effective and economical manufacturing method and may be made in any suitable shape and dimensions. The exemplary enclosed blade guard assembly 2 of FIGS. 2 and 4 is made of acrylic in the shape of a longitudinally elongated box, having vertical, parallel side walls that are separated by a horizontal distance. The side walls are joined at their upper edges by a top wall, and the top wall is joined to an upper mounting bracket 10. The side walls are joined at the front edge by a vertical front wall, and are joined at the rear edge by a vertical rear wall, parallel to the front wall, which contains a port to permit connection to a vacuum source 67, 70 for sawdust removal and collection. The side walls are each joined at the bottom edge by an acrylic bottom wall, said bottom wall having a centrally located slot to accommodate the saw blade, cutouts dimensioned and located to accommodate the two anti-kickback pawls 20 and the dropdown sawdust blowback containment box 21, a support mechanism which in this embodiment is either a) a combined splitter and combined splitter mounting plate 11, FIG. 2, 4 or b) alternate mounting plate 73 (FIG. 9). It will be appreciated that one of ordinary skill in the design, manufacture or operation of table saws and motor controls would, if given the disclosures herein, understand that there are many ways in which to implement the electronic controls shown in FIG. 6 and that such circuitry should be designed and disposed so as to minimize the operator proximity detection time and the motor braking time consistent with sound electronic practices.

The resulting enclosed blade guard assembly 2 is in the shape of a rectangular box, with a slot 79 (FIG. 5) in the bottom, of sufficient size to permit combined splitter mounting plate 11 to pass through, and the saw blade to rotate within the space enclosed by the side, top, front and rear walls of enclosed blade guard assembly 2. Exemplary upper mounting bracket 10 is also made of acrylic, in the shape of a frame enclosing and slidably engaging the front and rear edges of a combined splitter mounting plate 11 and is provided with a height-adjustment mechanism made up of parts 34, 36, 37, 38, as shown in FIG. 4, which permits the elevation of mounting bracket 10, and thus the height of the entire blade guard assembly 2, to be vertically adjusted, and permits the blade guard assembly 2 to be held firmly in place relative to the saw table 62.

In the exemplary embodiment of enclosed blade guard assembly 2, two proximity detection strips 42, are fastened along the bottom edge of the enclosure side walls at the juncture between the side walls and the bottom of the enclosure. Each of said proximity detection strips 42 is fabricated of a conductive metal strip, wire, or foil and each of said proximity detection strips 42 extends along approximately two-thirds of each side wall, beginning at a point near the front wall of enclosed blade guard assembly 2 and extending to a point approximately two-thirds of the distance from the front wall to the rear wall. This arrangement of proximity detection strips 42 is such that, if the saw operator touches, or is in very close contact with, a proximity detector 42, an electrical signal is sent to the control circuitry shown in FIG. 6. This indicates that a dangerous condition exists, and the control circuitry will trigger a DC injection braking circuit 19, shown in FIG. 6, to electromagnetically brake the saw motor rotor, and thereby shut down the saw and stop the blade very rapidly, before the operator can accidentally contact the spinning saw blade. The proximity detection strips 42 essentially form an electronic fence, to protect the saw operator, around the lower periphery of the enclosed blade guard assembly 2. Emergency stop switch 30 (FIGS. 2, 6) is also electrically connected to the proximity detection strips 42, as shown schematically in FIG. 6.

Figure 8:
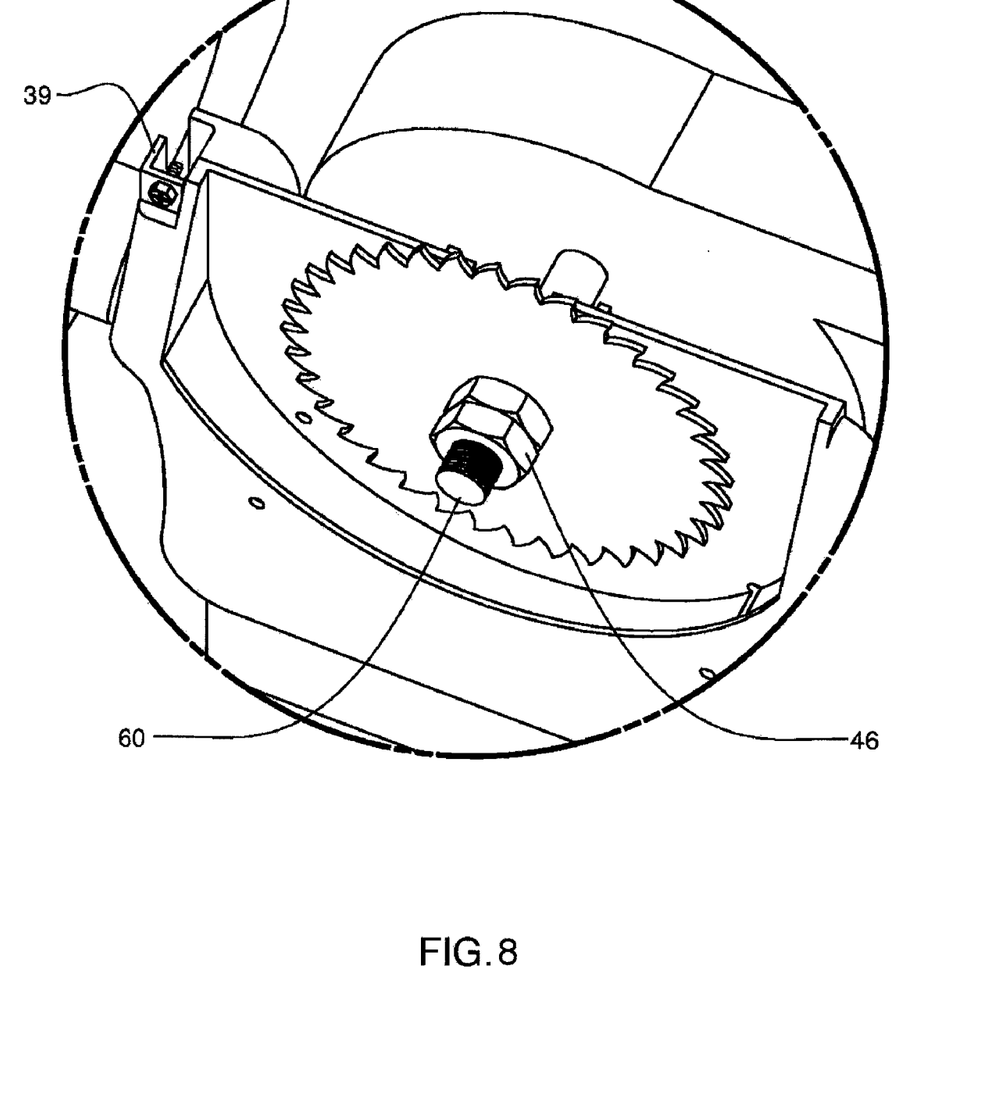
FIG. 8 is a perspective view of a preferred embodiment of a table saw blade and saw blade arbor, including a second locking arbor nut, in accordance with the present invention.

Enclosed blade guard assembly 2 must be mounted securely to the table saw, and must be positioned directly above the saw blade, in such a manner that the distance between the top of the saw table 62 and the bottom of enclosed blade guard assembly 2 may be adjusted to accommodate workpieces of any thickness that may be cut by the saw. It will be appreciated that one of ordinary skill in the design, manufacture or operation of table saws would, if given the disclosures herein, understand that there are many ways in which enclosed blade guard assembly 2 could be so mounted. Combined splitter and mounting plate 11 replaces the original splitter typically supplied with a table saw and is attached securely to the saw arbor and motor carriage assembly using mounting bracket 39 and bolt 41 (FIG. 4). In the exemplary embodiment, the bottom edge of the combined splitter and mounting plate 11 is fabricated with an extra thickness of metal and is threaded to accept bolt 41, to securely hold the combined splitter and mounting plate 11 which will, in turn, support the enclosed blade guard assembly 2. Mounting bracket 39 and bolt 41 replace the original splitter mounting hardware supplied with the exemplary table saw. The exemplary combined splitter and mounting plate 11, mounting bracket 39 and bolt 41 shown in FIGS. 4 and 8 are designed and adapted to be mounted on many models of existing Delta UNISAW® table saws. It will be appreciated that one of ordinary skill, if given the disclosures herein, would readily be able to design and manufacture a suitable combined splitter mounting plate, together with necessary mounting bracket and necessary hardware required for attaching the combined splitter and mounting plate to other brands or models of table saws.

Enclosed blade guard assembly 2, whether mounted on a splitter or otherwise, must be mounted in a vertically adjustable manner such that the distance between the top of the saw table 62 and the bottom of enclosed blade guard assembly 2 may be adjusted to accommodate any workpiece thickness, within a predetermined range, that the operator may desire to cut. It will be appreciated that one of ordinary skill in the design, manufacture or operation of table saws would, if given the disclosures herein, understand that there are many ways in which enclosed blade guard assembly 2 could be so mounted. A preferred vertically adjustable mount is provided by including two parallel, vertically oriented slots 34 in the splitter, as shown in FIGS. 2 and 4. Two threaded bolts mounted in handles 36 (FIG. 4) pass through respective holes 37 (FIG. 4) in the upper height adjustment frame of enclosed blade guard assembly 2, through a respective one of the two splitter slots 34 in combined splitter mounting plate 11, through a respective hole 37, in the opposite face of enclosed blade guard assembly 2, and screwed into a respective threaded handle 38, outside of and on the opposite face of enclosed blade guard assembly 2. By loosening the two sets of threaded handles 36, 38 (FIG. 4), enclosed blade guard assembly 2 is free to move vertically above the saw table 62. The enclosed blade guard assembly may be securely positioned at any desired height by firmly tightening the two sets of threaded handles, 36, 38 (FIG. 4). It will be appreciated that one of ordinary skill in the design, manufacture or operation of table saws would, if given the disclosures herein, understand that there are many ways to provide a suitable vertical height adjustment mechanism such as that made up of parts 34, 36, 37, 38, as shown in FIG. 4 for the purpose of adjusting and securing the enclosed blade guard assembly 2, which may be a mounting plate, including manually, electronically or pneumatically operated mechanisms. Generally, enclosed blade guard assembly 2 will be positioned by the operator at a height just sufficient to fit and slide the workpiece (to be cut) between the surface of the saw table 62 and the bottom surface of enclosed blade guard assembly 2. In such a position, enclosed blade guard assembly 2 will block the operator's fingers, hands or arms from coming into contact with the moving saw blade and, in conjunction with the electronic proximity detector strips 42 and the proximity detection circuitry 17 and motor brake circuitry 19, as shown schematically in FIG. 6, and in further conjunction with the indicator lights 23, 24 and 25 and operating switches 30 and 45 described herein, will greatly reduce the probability of operator injury by contact with the rotating saw blade. Further, so positioned, the enclosed blade guard assembly 2 will prevent workpiece kickback, by vertically constraining the face of the workpiece to the saw table 61, and, in conjunction with the anti-kickback pawls 20 described herein, will greatly reduce the possibility of operator injury by workpiece kickback.

Figure 7:
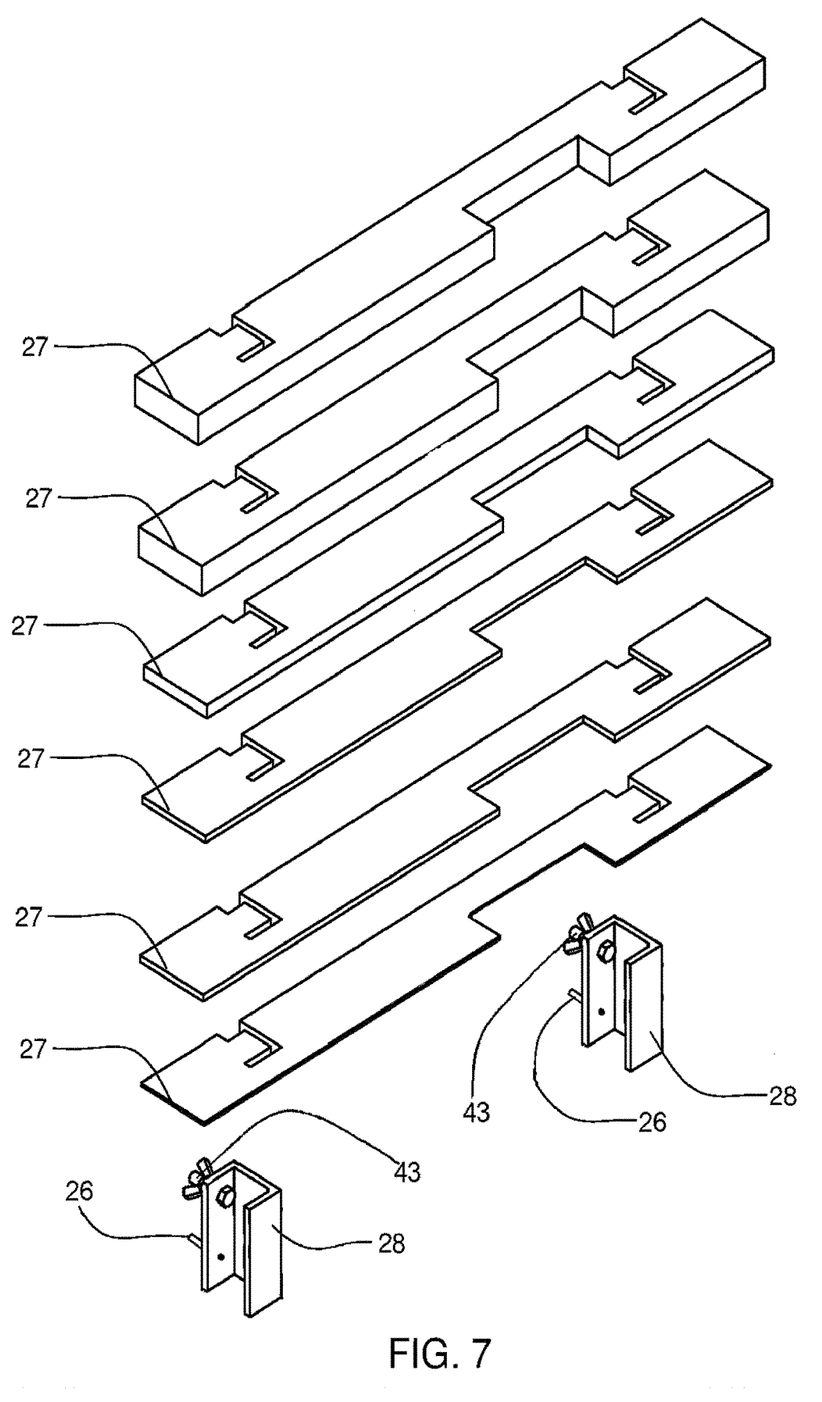
FIG. 7 is a perspective view of a preferred embodiment of a rip fence adapter for a table saw in accordance with the present invention.

A rip fence adapter assembly shown in FIG. 7 may be provided for use with enclosed blade guard assembly 2, to permit narrow ripping cuts to be made closer to the fence than the width of enclosed blade guard assembly 2 would otherwise permit. The fence adapter may be comprised of a number of stackable pieces 27, each of calibrated thickness, that are attached to the rip fence by positioning brackets 28, mounted to the standard table saw rip fence and on which one or more of the stackable pieces 27 are stacked. Stackable pieces 27 may be manufactured of wood, acrylic, high density polypropylene, or any suitable and cost-effective material. Nonconductive materials are preferred for the portions of the stackable pieces 27 that may come in contact with the proximity detection strips 42, to avoid inadvertent triggering of the operator proximity detector 17. Each of the stackable pieces 27 should be of a different and graduated thickness, thereby permitting the operator to selectively stack the pieces 27 in nominal ⅛ inch (3.175 mm) thickness increments, to allow the sawing of workpieces with thicknesses ranging from less than ⅛ inch (3.175 mm) up to the maximum cutting capacity of the table saw, as determined by the saw blade diameter. Such stackable pieces 27 with graduated thickness will minimize the gap between the bottom edge of enclosed blade guard assembly 2 and the top surface of the workpiece, thus improving both maintenance of dust collecting vacuum within enclosed blade guard assembly 2, and protection of the operator from accidental contact with the blade. The exemplary embodiment shown in FIG. 7 has six stackable pieces 27 of graduated thicknesses: ⅛ inch (3.175 mm), ¼ inch (6.35 mm), ¼ inch (6.35 mm), inch (12.7 mm), 1 inch (25.4 mm) and 1 inch (25.4 mm), thereby accommodating, in ⅛ inch increments, the full range of workpieces, of up to 3 inches (7.62 cm) thick, which may be cut by a standard 10 inch (25.4 cm) table saw blade. It will be appreciated that one of ordinary skill in the design, manufacture or operation of table saws would, provided the disclosures herein, be able to make appropriate modifications to the number and thicknesses of stackable pieces 27 for table saws having a saw blade of more or less than 10 inch (25.4 cm) diameter. As shown in FIG. 7, a rectangular cutout is provided in each stackable piece 27 at a position that permits correct operation of the dropdown sawdust containment box 21 (FIGS. 1 and 2), when the stackable pieces 27 are positioned to permit a narrow rip cut close to the saw blade and thus under the bottom edge of enclosed blade guard assembly 2. Thus, a sufficient number of stackable pieces 27 may be selected by the saw operator to provide solid lateral support for the workpiece being ripped but slightly less in total thickness than the thickness of the workpiece. In the embodiment shown in FIG. 7, the stackable pieces 27 are firmly and securely held in alignment against the table saw supplied rip fence by the positioning brackets 28 which are attached directly to the table saw rip fence by means of bolt and wing-nut assembly 43 and positioning pin 26. It will be appreciated that one of ordinary skill in the design, manufacture, or operation of table saws would, if given the disclosures herein, be able to design and make a number of simple mechanical mounting arrangements to securely attach the stackable pieces 27 to a rip fence. Any such embodiment of rip fence adapter assembly must permit the stackable pieces 27 to be positioned under the bottom of enclosed blade guard assembly 2 to provide an extension of the fence that can be set laterally close to, and almost touching, the saw blade (when such a narrow ripping cut is desired) and yet can also be set to provide any desirable distance between blade and rip fence in operation of the saw and which can maintain close proximity of the bottom of enclosed blade guard assembly 2, and the top of the workpiece over the full range of cuts, typically about 3 inches (7.62 cm) for a standard 10 inch (25.4 cm) table saw.

A further aspect of the present invention enhances operator safety by providing an electronic control system, as shown in FIG. 6, for motor control switching, operator proximity detection, and an emergency motor braking system in conjunction with enclosed blade guard assembly 2. The exemplary control circuitry shown in FIG. 6 consists of two mechanically interlocked motor power contactors C1, C2, a low-voltage 12 volt power supply, a DC injection braking module 19, an operator proximity switch module 17 functioning in conjunction with relay R1, a bi-stable latch circuit consisting of relay R2 and the associated transistor, resistors and capacitors, along with associated operator controls and switches. The table saw original motor control circuit is shown as the 28 volt AC circuitry used to control contactor C1 through the standard START and STOP switches wired in series. In addition, when triggered by a closure between pins 1 and 2, the DC injection braking module 19 will open contactor C1 and close contactor C2 to effect a rapid emergency stop of the motor. Low power, 12 volt DC circuitry is used to power the proximity switch module as well as the additional operator control switches and indicators. The R1, R2, C1 and C2 low voltage contacts are primarily safety interlocks for control of the motor power and braking functions. The circuitry shown in FIG. 6 will prevent the saw from starting, unless the brake circuit is armed (enabled) by the operator, prior to each start of the saw motor.

As an exception to the required safety start, a keyed supervisory override switch S1 (FIG. 6) is provided to permit the saw to be started without activation of the safety emergency braking system, for cases in which a particular saw operation requires removal of the blade enclosure assembly 2. For example, a workpiece or assembly which is of greater height than the maximum saw blade height above the table surface may be required to be positioned on the saw table and moved across the cutting blade. Such a workpiece would therefore not fit under the blade enclosure assembly, with or without the splitter, which must be removed for the operation, but the workpiece size is so large as to pose far less risk of the operator's hand approaching too close to the spinning saw blade. In the exemplary circuit shown in FIG. 6, relay R2 and associated circuitry form a latch which is toggled ON or OFF by the operator, in order to arm or disarm the brake, as required. The latch circuit is also arranged to disarm the brake each time the saw motor is stopped, to allow the saw operator to perform necessary saw and enclosure adjustments without triggering the brake circuit. As a safety measure, each new saw start will require the operator to acknowledge that the saw safety checks have been completed by depressing a switch 45 (FIG. 2), thereby arming the brake circuit and illuminating a "brake armed" indicator 25 (FIG. 2 and FIG. 6).

Figure 5:
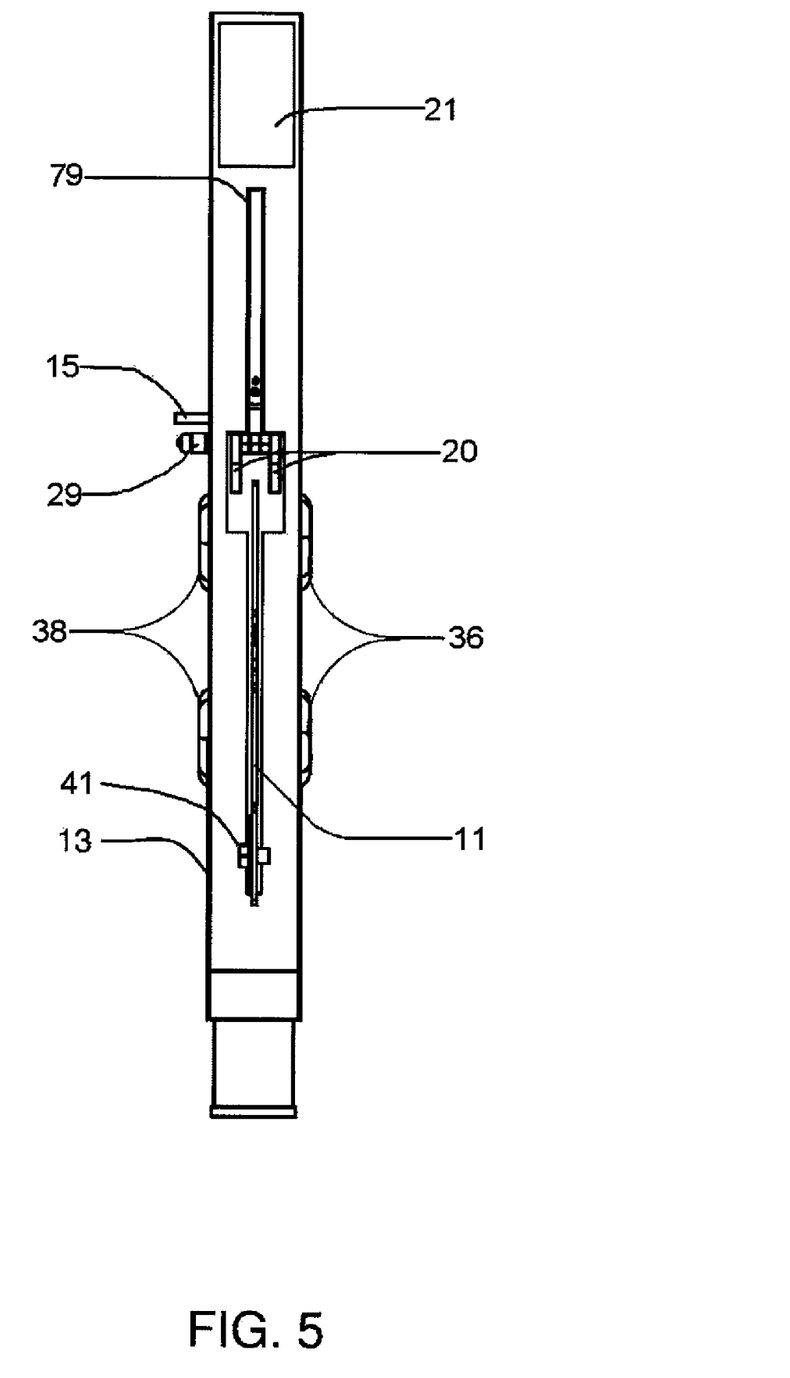
FIG. 5 is a detailed bottom view of a preferred embodiment of a blade guard with a proximity detection system for a table saw in accordance with the present invention.

It will be appreciated that one of ordinary skill in the design, manufacture or operation of table saws would, if given the disclosures herein, understand that there are many ways in which the proximity of the operator's body to the saw blade could be electronically detected, including the employment of signaling methods involving, for example: photoelectric, infrared or other optical, conductivity, capacitance, inductance, radio frequency signals, or voltage change detectors. Further, it will be appreciated that there are many locations and means of mounting such detectors on enclosed blade guard assembly 2 to sense dangerous proximity of the operator to the blade. An exemplary proximity detection system according to the present invention is shown in FIGS. 2 & 5. Two conductive strips 42 are placed along side and/or bottom surfaces of enclosed blade guard assembly 2: one strip on each side of the saw blade slot, with both extending forward and aft of the saw blade slot. Operator proximity may be detected through the use of any of a number of conductive materials, including for example metal strips, foil, wire or mesh. The exemplary proximity detection strips 42 are fabricated of metal foil and are electrically connected to monitoring circuit 17 in the electronic control unit as shown in FIG. 6. In the preferred embodiment, operator proximity to either proximity detector strip 42 will cause an immediate change in electrical capacitance, which will be detected by the monitoring circuit 17. The monitoring circuit then triggers circuitry controlling emergency brake 19.

It will be appreciated that one of ordinary skill would, if given the disclosures herein, understand that there are a number of emergency brake systems 19 which could be used, including, for example, DC injection, motor plug braking, variable frequency motor control circuitry "VFD" with braking capability, resistor motor circuit braking, regenerative motor braking or electro-mechanical braking. Brake subsystem 19, used in the exemplary table saw safety system shown in FIG. 6, is but one of a number of prior art commercially available DC injection units. An exemplary schematic circuit diagram of a complete table saw motor control circuit, integrated with the table saw manufacturer-supplied magnetic motor, is shown in FIG. 6. When this invention's emergency braking feature is added to retrofit a table saw, an additional arbor locking nut 46 (FIG. 8) should be provided, in addition to the usual, primary arbor nut which secures the blade to the arbor. This second locking nut 46 prevents possible loosening of the primary nut by the strong reverse torque force applied to the saw motor and saw blade arbor by the emergency brake 19 which, otherwise, could potentially loosen the primary arbor nut, allowing the blade to spin freely when the saw arbor is stopped. It will be readily appreciated that one of ordinary skill, if given the disclosures herein, would understand that there are other means which could be used to insure that the primary arbor nut will not be loosened by the reverse torque force of the motor brake, including the use of an appropriate lock washer, secured castle nuts, nylon or elastic insert nuts or stop nuts.

The present invention further secures operator safety by providing an effective operator-controlled anti-kickback mechanism built into enclosed blade guard assembly 2. It is well established that dangerous table saw kickback occurs when the trailing edge of the saw blade lifts the workpiece off and above the surface of saw table 62. Once the workpiece is lifted by the saw blade, it sets up a positive feedback process that will continue until the blade catches on the workpiece, hurling it in the direction of the operator at high velocity, theoretically up to 120 mph (74.4 kph), for a standard 10 inch (25.4 cm) saw blade. As with prior art blade guards, it has been found that prior art anti-kickback devices are not very effective and often interfere with routine saw operation and are routinely disconnected or removed by saw operators.

When secured in the operating position, the enclosed blade guard assembly 2 of the present invention itself functions as an effective anti-kickback device by preventing the workpiece from being lifted as it moves past the trailing edge of the saw blade. Thus, the positive feedback elevation process of the workpiece is never initiated and kickback is unlikely to occur. In addition, in the preferred embodiment, enclosed blade guard assembly 2 is provided with two anti-kickback pawls 20 that are normally in contact with the top surface of the workpiece as it is moving past the saw blade and will immediately bind and prevent any reverse movement of the workpiece. Anti-kickback pawls 20 (FIGS. 2 & 4) are fabricated of non-ferrous metal or other convenient material and the lower ends are preferably coated with a suitable anti-skid material, to insure a positive grip on the workpiece in the event of any reverse movement of the workpiece and also to prevent scratching or marring such workpieces as may occur with most serrated or toothed prior art anti-kickback pawls. Preferred embodiments of two anti-kickback pawls 20 (FIG. 4) are shown, attached to enclosed blade guard assembly 2 and are held in position by mounting pin 88. The head of mounting pin 88 is held in position in a recessed enclosed blade guard assembly in the right side enclosed blade guard assembly access cover 92 (FIG. 4) of enclosed blade guard assembly 2 and is supported by the reinforced frame of enclosed blade guard assembly 2, when the right side enclosed blade guard assembly access cover 92, is fastened in place on enclosed blade guard assembly 2 by means of access cover screws 93. Each anti-kickback pawl 20 is provided with two centering spacers 89 with both centering spacers attached to anti-kickback pawl 20 by means of screw 91. Both anti-kickback pawls 20 and all four centering spacers 89 are disposed to rotate freely on mounting pin 88. The weight of anti-kickback pawls 20 and centering spacers 89 cause both anti-kickback pawls to fall by gravity and engage the workpiece being cut on either side of the saw kerf.

In a preferred embodiment, an anti-kickback disengaging lever 29 is incorporated into the enclosed blade guard assembly 2. Said disengaging lever 29 is disposed adjacent to the anti-kickback pawl mounting pin 88, and is connected to a lifting plate 97. Lifting plate 97 is fitted on the threaded shaft of disengaging lever 29 and is held in position by means of two machine nuts 94 which further serve to hold the threaded shaft of disengaging lever 29 in position within enclosed blade guard assembly 2 while allowing both shaft and lifting plate 97 to turn. When disengaging lever 29 is manually turned by the operator, attached lifting plate 97 will also turn, engaging the both anti-kickback pawls 20, causing them to lift and disengage from the surface of the workpiece. Those experienced in table saw operation recognize the importance of being able to temporarily disengage the anti-kick mechanism during certain types of partial-cut sawing operations.

Conventional safe operating practice for table saws has long suggested that the operator remain positioned at the front of the saw, and move the entire workpiece past the blade until the cut is completed. However, when cutting long workpieces, the operator must either have a second person assist, by holding and supporting the weight of the out-fed workpiece, or employ some sort of improvised out-fed support, which can lead to an unsafe condition. With table saws having the enclosed blade guard hold-down feature of the present invention, together with the positive anti-kickback feature of anti-kickback pawls 20, the workpiece is safely secured to the saw table 62 and will not kick back toward the front of the saw. This permits the operator, when necessary, to safely move to the rear of the saw and to adjust his or her grip on the workpiece as the trailing edge of the workpiece approaches and to draw the workpiece through, to complete the cut, and to prevent the workpiece from falling off the saw table at the end of the cut. This advantage affords the operator much greater control of the workpiece during the entirety of the cutting operation.

Enclosed blade guard assembly 2 may further include features that promote safe saw operation, including electrical safety interlocks included in the electronic control circuit shown in FIG. 6 and status indicator lights 23, 24 and 25. One safety interlock will prevent the saw from starting unless the enclosed blade guard assembly 2 is in place and electrically connected to the electronic control circuit shown in FIG. 6. An exemplary emergency stop switch 30 may also be mounted on the front of enclosed blade guard assembly 2 as shown in FIGS. 2, 4 and 6. This readily accessible switch will remove motor power and trigger the emergency motor braking system when called for by the operator. Due to the added stresses to the motor and mechanical components of the table saw during emergency stopping, this switch is not intended for routinely stopping the saw; rather, the normal stop switch should be employed for routine starting and stopping operations.

An exemplary supervisory keyed override switch S1 is shown in FIG. 6 and may be used by the saw operator to override said electric safety interlock for saw operations that require the removal of enclosed blade guard assembly 2. Non-through cutting, such as cutting grooves or dados, are examples of cuts that do require removal of enclosed blade guard assembly 2. An exemplary safety check complete or brake arming switch 45 may be provided that prevents starting the table saw until the operator depresses this switch thereby arming the brake circuit and acknowledging that the blade enclosed blade guard assembly is attached and that all safety checks have been completed. Safety check switch 45 is arranged in the control circuitry such that it must be depressed by the operator prior to each saw start. Electronic indicators, as exemplified by 23, 24 and 25, may be mounted on enclosed blade guard assembly 2 to provide the saw operator with a visual indication of the status of the saw's systems including power, vacuum strength, brake arming status, and other functions which may be helpful to the operator. Enclosed blade guard assembly 2 may also be provided with an interior blade light 22 which, for example may be an LED (Light Emitting Diode) light, to illuminate the saw blade and surrounding area of the saw table 62. Enclosed blade guard assembly 2 may include a removable or a hinged saw blade viewing port 14 located above the blade, to facilitate visual check of workpiece setup. Such viewing port 14 must be made so as to be securely closed during saw operation so as to preserve vacuum within the enclosed blade guard 2.

Enclosed blade guard assembly 2 when used in conjunction with a dust collection system, is connected by the self-supporting hoses 67, 70 and connector 68 shown in FIG. 3 described herein, significantly improves the health and safety environment of the saw operator by containing and extracting sawdust and preventing its release into the air being breathed by the operator. It is essential that the connection hose to the enclosed blade assembly 2 not interfere with the movement of wide work pieces across the saw table as they are moved the saw. The present invention's hose-supporting arrangement, as shown in FIG. 3, will easily accommodate a 24 inch (60.96 cm) workpiece clearance to the right side of the blade.

If additional clearance is required to the right side, or rip fence side, of the blade, hose connector support piece 68 can be easily moved further out along the table extension rear rail 65 (FIG. 3) to meet the requirement for additional workpiece clearance, and connecting hose 67 can be correspondingly lengthened as required. Connector 68 is provided with a removable plug 69 to facilitate cleanout and access to the bolt and wing nut hardware which attaches the connector support piece 68 to the table extension rear rail 65 FIG. 3.

Figure 10:
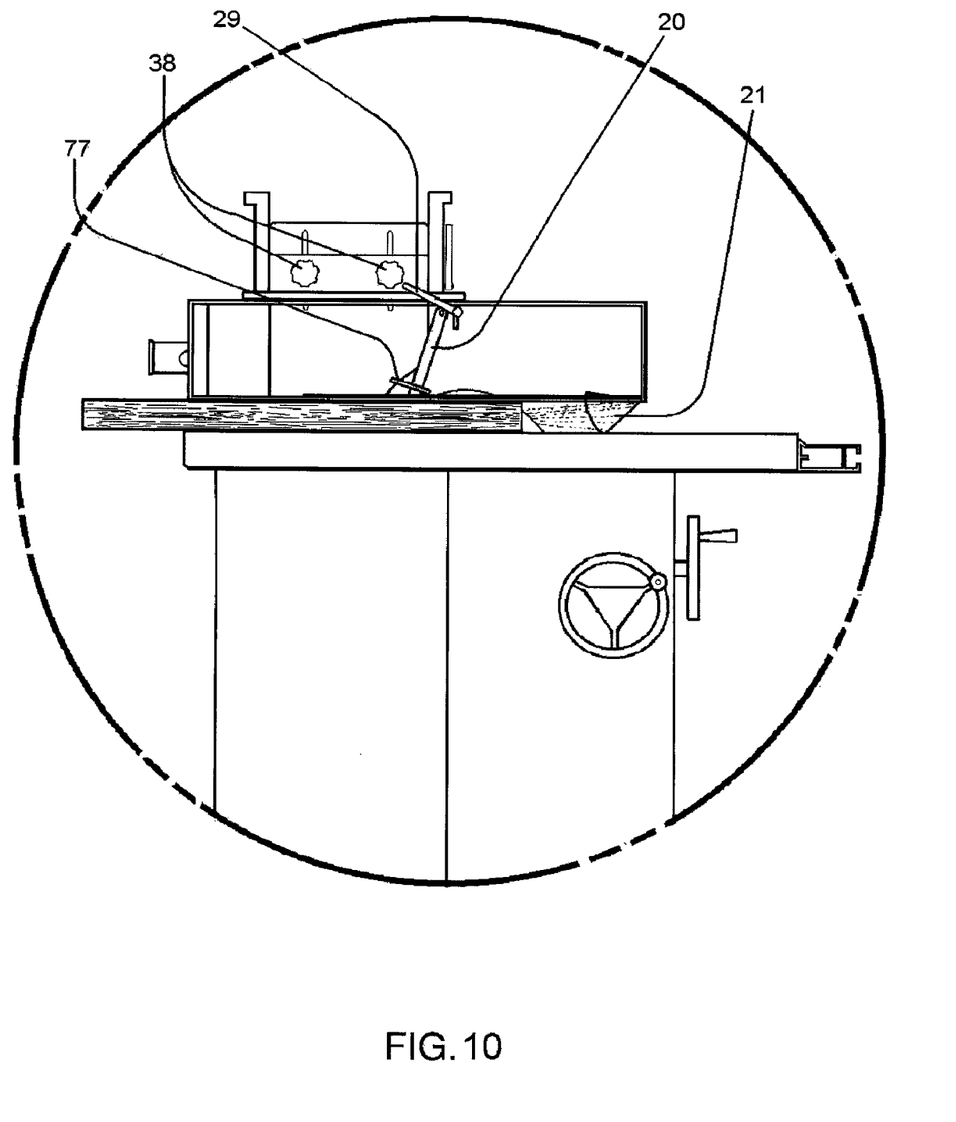
FIG. 10 is a side view of a preferred embodiment of a blade guard with drop box deployed to capture saw dust blown back at the end of each cut.

In many prior art table saws, even those with dust containment provision, copious quantities of sawdust are normally blown straight back toward the operator at the end of a cutting operation, as the saw blade exits the end of the workpiece. The present invention eliminates greatly alleviates this problem through provision of a dropdown sawdust containment box 21 which helps capture this normal saw dust blowback. While the workpiece is being sawn, but before the trailing edge of the workpiece reaches the leading edge of enclosed blade guard assembly 2, the dropdown sawdust containment box 21 is supported by the upper surface of the workpiece, and its trailing edge is thus held in the horizontal plane of the bottom of enclosed blade guard assembly 2 throughout the cutting operation. As the trailing edge of the workpiece passes aft of the leading edge of enclosed blade guard assembly 2 and thus before the leading edge of the saw blade reaches the trailing edge of the workpiece, dropdown sawdust containment box 21 is no longer supported by the workpiece and thus pivots on its hinge, until the trailing edge comes into contact with the saw table 62. When the leading edge of the saw blade cuts through the trailing edge of the workpiece, sawdust is blown back by the rotational effect of the high speed blade, but comes in contact with the bottom surface of dropdown box 21, is deflected back into enclosed blade guard assembly 2, and is captured by the vacuum system rather than being blown directly toward the operator.

It will be apparent to those of ordinary skill in the rotary saw art that various changes and modifications are possible, within the scope of the present invention. In particular, different combinations of the individual safety features could be used, so the invention is not limited to the specific embodiments shown and described above, but rather is defined by the following claims.

What is claimed is:

1. A health and safety device adapted for attachment to a planar sawing table (62) and a rotary saw mounted therein, comprising
a support structure (11; 71) coupled to the sawing table at a location which permits free passage of a workpiece past a rotating blade of said saw,
a blade enclosure (2) open along a plane parallel to said planar sawing table and having walls surrounding said saw blade, for purposes of both separating body parts of a saw operator from said saw blade and keeping sawdust produced during sawing operations away from a saw operator,
a contact detector mounted along at least a portion of bottom edges of said blade enclosure which, during saw operation, detects direct electrical contact between a conductor, forming part of said detector, and any portion of a saw operator's body, and generates a hazard signal;
a motor braking circuit which responds to said hazard signal by rapidly electromagnetically braking rotation of said saw blade by DC injection braking to avoid or minimize operator harm; and
an adjustable fixation device (34, 38) for fixing said blade enclosure (2) at a desired elevation above said sawing table for at least the duration of a cutting operation, said elevation being selectable within a range and corresponding to a thickness of said workpiece, to thereby prevent workpiece kickback by constraining a face of the workpiece to the sawing table.

2. The health and safety device of claim 1, wherein said support structure (11) is located within a generally planar kerf space, parallel with said saw blade, produced by removing material from said workpiece during rotary cutting operations of said saw blade.

3. The health and safety device of claim 1, wherein said support structure (71) is located adjacent a peripheral edge of said sawing table, in order to allow free movement of said workpiece across said sawing table, and includes a lateral portion (74) extending horizontally from said peripheral edge toward said saw blade, and
a depending portion which extends from said lateral portion (74) downward, in order to support said blade enclosure (21) in a position adjacent said saw blade.

4. The health and safety device of claim 1, wherein said blade enclosure (2) is provided with
an operator-actuatable safety switch (45) which activates said proximity detection circuit and said motor brake circuit and
wherein the saw motor of said table saw is configured not to start until said operator-actuatable safety switch has been depressed, prior to each successive saw start.

5. The health and safety device of claim 1, further comprising electronic condition indicator lights indicating at least one of:
electric power to the saw,
blade lighting,
emergency brake armed and ready,
dust collection air flow; and
at least a threshold vacuum level in said blade enclosure.

6. The health and safety device of claim 1, wherein
said blade enclosure is a longitudinally elongated box having vertical, parallel side walls that are separated by a horizontal distance, said side walls joined at their upper edges by a top wall, said side walls joined at the front edge by a vertical front wall, said side walls joined at the rear edge by a vertical rear wall, parallel to the front wall, said side walls each joined at the bottom edge by a bottom wall, said bottom wall having a centrally located slot to accommodate the saw blade of said table saw.

7. A health and safety device adapted for attachment to a planar sawing table (62) and a rotary saw mounted therein, comprising:
a support structure (11; 71) coupled to the sawing table at a location which permits free passage of a workpiece past a rotating blade of said saw,
a blade enclosure (2), open along a plane parallel to said planar sawing table, and having walls surrounding said saw blade, for purposes of both separating body parts of a saw operator from said saw blade and keeping sawdust produced during sawing operations away from a saw operator,
a contact detector (17, 42) mounted along at least a portion of bottom edges of said blade enclosure which, during saw operation, detects direct electrical contact between a portion (42) of said detector and any portion of a saw operator's body and generates a hazard signal; and
means (76, 77) for electromagnetically braking saw rotation by DC injection, in response to said hazard signal, within a predetermined short shutoff time interval, in order to prevent or minimize injury to said portion of said operator's body, and
an adjustable fixation device (34, 38) for fixing said blade enclosure (2) at a desired elevation above said sawing table for at least the duration of a cutting operation, said elevation being selectable within a range and corresponding to a thickness of said workpiece, to thereby prevent workpiece kickback by constraining a face of the workpiece to the sawing table.

8. The health and safety device of claim 7, wherein said contact detector (17, 42) operates by detecting a capacitance change resulting from operator contact with a portion (42) of said detector (17, 42); and
wherein said contact detector and electromagnetic braking means are configured to prevent the motor of said table saw from starting, unless said blade enclosure is mounted on the support structure and is electrically connected to control circuits of said motor.

9. The health and safety device of claim 7, further comprising
a key-operated supervisory override switch (S1) that will override said contact detector (17, 42) and will permit said motor to start, notwithstanding any disconnection of said blade enclosure, in order to permit cutting operations which could not readily be performed with said blade enclosure in place.

* * * * *